US005171947A

United States Patent [19]

Kusunoki et al.

[11] Patent Number: 5,171,947

[45] Date of Patent: Dec. 15, 1992

[54] HIGH-FREQUENCY HEATING APPARATUS

[75] Inventors: Shigeru Kusunoki, Yamatokoriyama; Takashi Kashimoto, Nara; Koji Yoshino, Kyoto, all of Japan

[73] Assignee: Matsushita Electric Industrial Co., Ltd., Osaka, Japan

[21] Appl. No.: 704,182

[22] Filed: May 22, 1991

[30] Foreign Application Priority Data

Jun. 1, 1990 [JP] Japan .................................. 2-144747

[51] Int. Cl.$^{5}$ ............................................. B23K 15/10

[52] U.S. Cl. ...................... 219/10.55 B; 219/10.55 D; 219/10.55 F; 219/10.55 R

[58] Field of Search .................. 219/10.55 B, 10.55 F, 219/10.55 M, 10.55 D, 10.55 E, 10.55 R, 10.55 A

[56] References Cited

U.S. PATENT DOCUMENTS

| | | | |
|---|---|---|---|
| 2,704,802 | 3/1955 | Blass et al. | 219/10.55 F |
| 4,162,381 | 7/1979 | Buck | 219/10.55 B |
| 4,185,181 | 1/1980 | Kaneko et al. | 219/10.55 F |
| 4,297,557 | 10/1981 | Tyler et al. | 219/10.55 R |
| 4,520,250 | 5/1985 | Ishihara et al. | 219/10.55 F |
| 4,582,971 | 4/1986 | Ueda | 219/10.55 B |
| 4,734,553 | 3/1988 | Noda | 219/10.55 B |
| 4,831,239 | 5/1989 | Ueda | 219/10.55 B |
| 4,920,246 | 4/1990 | Aoki | 219/10.55 B |

FOREIGN PATENT DOCUMENTS

| | | | |
|---|---|---|---|
| 0051133 | 4/1977 | Japan | 219/10.55 B |
| 0002541 | 1/1979 | Japan | 219/10.55 B |
| 0013037 | 1/1979 | Japan | 219/10.55 B |
| 59-207595 | 11/1984 | Japan . | |

*Primary Examiner*—Bruce A. Reynolds
*Assistant Examiner*—Tu Hoang
*Attorney, Agent, or Firm*—Wenderoth, Lind & Ponack

[57] ABSTRACT

A high-frequency heating apparatus includes: a high-frequency oscillator for generating high-frequency electromagnetic waves using electrical power supplied from a power source circuit; a heating chamber into which the high-frequency electromagnetic waves are supplied by the high-frequency oscillator; a receiving antenna which is provided outside the heating chamber and adjacent to an opening of the heating chamber; a dielectric plate for covering the opening, which is provided between the heating chamber and the antenna; and a control circuit which receives an output from the antenna via a detector so as to output a control signal to the power source circuit.

7 Claims, 4 Drawing Sheets

HIGH-FREQUENCY HEATING APPARATUS

BACKGROUND OF THE INVENTION

The present invention relates to a high-frequency heating apparatus such as an electronic range, in which a high-frequency source, e.g. a magnetron, is controlled by detecting the field intensity in a cabinet.

A high-frequency heating apparatus is known from, for example, Japanese Laid-Open patent Publication No. 59-207595 in which by using transmitting and receiving antennas confronting a heating chamber, changes of dielectric constant of an article to be heated (hereinbelow, referred to as a "food") dependent upon temperature of the food are detected so as to control a high-frequency heat source.

However, the known high-frequency heating apparatus in which the antennas confront the heating chamber has a drawback in that especially at the time of heating of the food, a large amount of water or oil from the food scatters in the cabinet and penetrates into a contact point between the receiving antenna and a detector, thereby resulting in great change in detection characteristics.

SUMMARY OF THE INVENTION

Accordingly, an essential object of the present invention is to provide a high-frequency heating apparatus in which an antenna is provided outside a heating chamber so as not to be contaminated by water or oil scattered from a food in the heating chamber.

In order to accomplish this object of the present invention, a high-frequency heating apparatus according to the present invention comprises: a high-frequency oscillator for generation a high-frequency electromagnetic wave using electrical power supplied from a power source circuit; a heating chamber into which the high-frequency electromagnetic wave is supplied by said high-frequency oscillator; a receiving antenna which is provided outside said heating chamber and adjacent to an opening of said heating chamber; a dielectric plate for covering the opening, which is provided between the heating chamber and the receiving antenna; and a control circuit which receives an output from the receiving antenna via a detector so as to output a control signal to said power source circuit.

BRIEF DESCRIPTION OF THE DRAWINGS

This object and features of the present invention will become apparent from the following description taken in conjunction with the preferred embodiment thereof with reference to the accompanying drawings, in which.

Before the description o the present invention proceeds, it is to be noted that like parts are designated by like reference numerals throughout the accompanying drawings.

DETAILED DESCRIPTION OF THE INVENTION

Figure 1:
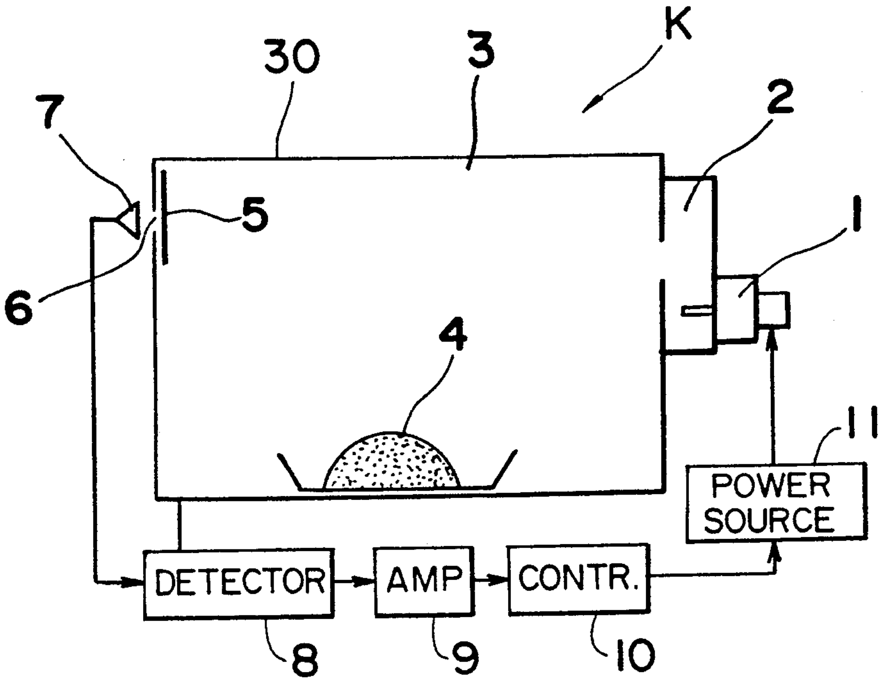
FIG. 1 is a schematic view of a high-frequency heating apparatus according to one embodiment of the present invention.

Referring now to the drawings, there is shown in FIG. 1, a high-frequency heating apparatus K according to one embodiment of the present invention. In the heating apparatus K, electromagnetic waves emitted from a high-frequency oscillator 1 are supplied, through a waveguide 2, into a high-frequency heating chamber 3 so as to heat a food 4 in a cabinet 30 having a shape of rectangular parallelepiped. The electromagnetic waves in the cabinet 30 is detected, via a dielectric plate 5 and an opening 6 of the cabinet 30, as a direct current by a detector 8 provided with a receiving antenna 7. The detector 8 has a grounded conductor whose one portion is connected to a wall of the cabinet 30. A current signal detected by the detector 8 is fed, through an amplifier 9, to a control circuit 10 leading to a power source circuit 11. Since the amplifier 9 is provided between the detector 8 and the control circuit 10, the power source circuit 11 can be controlled stably at a high signal level against noise.

FIG. 2 and FIGS. 3*a* to 3*c* show the opening 6 and the detector 8. By using machine screws 13, the detector 8 is secured to a bracket 12 attached to an outer surface of the wall of the cabinet 30. The detector 8 is formed by a microstrip line including an active conductor 14 and grounded faces 15 and 16. The detector 8 further includes resistors 17, 18 and 19, a diode 20 and a capacitor 21. The grounded faces 15 and 16 are connected to each other by forming a through-hole or by a connecting conductor 22. Since the grounded face 16 is held in contact with the bracket 12, the grounded faces 15 and 16 of the microstrip line have a potential identical with that of the heating chamber 3, so that a microwave transmission circuit functioning stably is obtained. By using another connecting conductor 23, a conductor piece at the side of the grounded face 16 is connected to the active conductor 14 at the side of the grounded face 15 so as to act as the receiving antenna 7. The dielectric plate 5 is fixed to an inner surface of the wall of the cabinet 30 by bonding agent, etc. so as to cover the opening 6. Therefore, the dielectric plate 5 confronts is disposed so as to cover the antenna 7 in front of the opening 6 and prevents water and oil in the cabinet 30 from reaching the antenna 7 directly. Lead wires 24 and 25 are respectively attached to the active conductor 14 and the grounded face 15 by solder, etc. and are fed to the amplifier 9.

Figure 2:
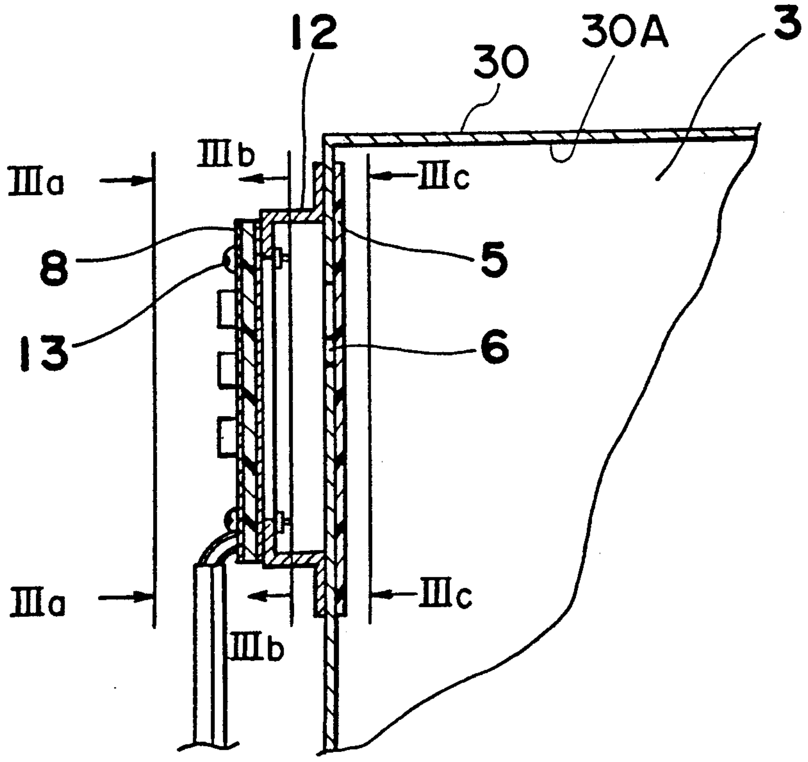
FIG. 2 is a fragmentary sectional view of the heating apparatus of FIG. 1.
Figure 3C:
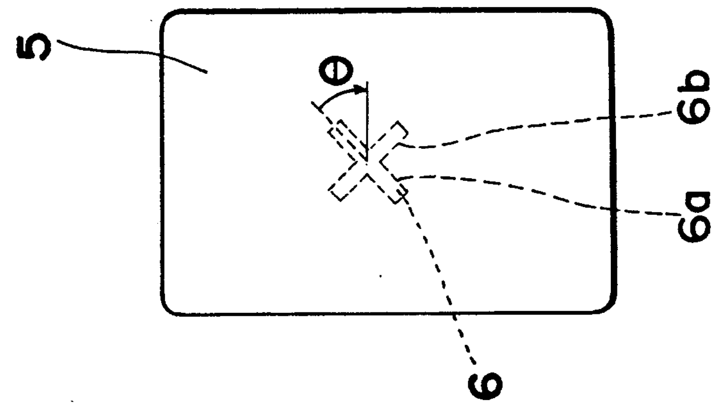
FIGS. 3*a*, 3*b* and 3*c* are views observed in the directions of the arrows IIIa—IIIa, IIIb—IIIb and IIIc—IIIc in FIG. 2, respectively.

The opening 6 is of a crossed shape having crossing portions 6*a* and 6*b* and the crossing portions 6*a* and 6*b* are inclined at an angle $\theta$ relative to a horizontal direction of the cabinet 30 as shown in FIG. 3*c*. Meanwhile, as shown in FIG. 2, the heating chamber 3 defines a rectangular contour having a straight portion 30A, etc. in a plane at which the opening 6 confronts the dielectric plate 5.

Figure 3B:
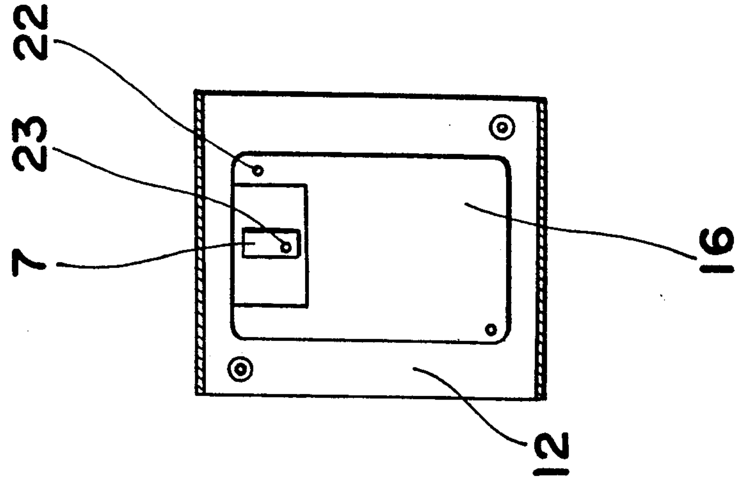
Figure 3A:
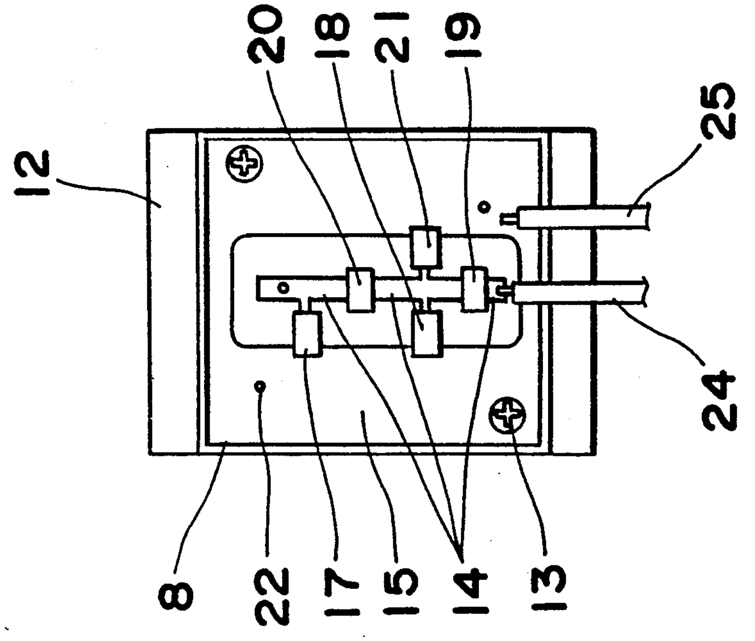

Therefore, the crossing portions 6*a* and 6*b* extend obliquely relative to the straight portion 30A of the contour and thus, the antenna 7 is least likely to be affected by mode changes of the standing waves in the heating chamber 3. As a result, the average entire change of dielectric loss in the heating chamber 3 can be received by the single receiving antenna 7 without the need for providing a plurality of antennas. Meanwhile, since the crossing portions 6*a* and 6*b* deviate from a longitudinal direction of the antenna 7 as shown in FIGS. 3*b* and 3*c*, the average entire change of dielectric loss in the heating chamber 3 can be received by the receiving antenna 7.

Figure 6A:
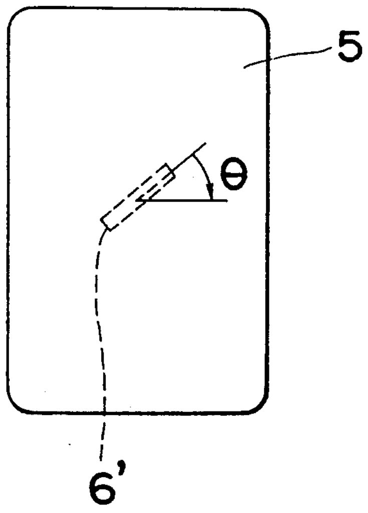
FIGS. 6*a* and 6*b* are views similar to FIG. 3*c*, particularly showing first and second modifications thereof, respectively.
Figure 6B:
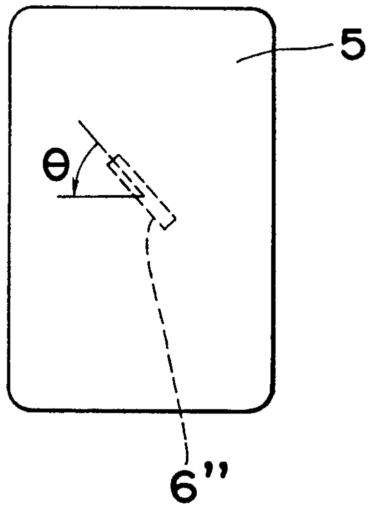

Meanwhile, in the above embodiment, the opening 6 has a crossed shape. However, the opening 6 is not restricted to the crossed shape but may have any elongated shape such as an opening 6' in FIG. 6*a* or an opening 6'' shown in FIG. 6*b* such that a longitudinal direction of the opening 6' or 6'' extends obliquely relative to the straight portion 30A of the contour. Likewise, the longitudinal direction of the opening 6' or 6'' deviates from the longitudinal direction of the antenna 7.

Furthermore, in the above embodiment, the opening 6 is formed in the side wall of the cabinet 30. However, the present invention can also be applied to an arrangement in which the opening 6 is formed in the top plate of the cabinet 30.

Figure 4:
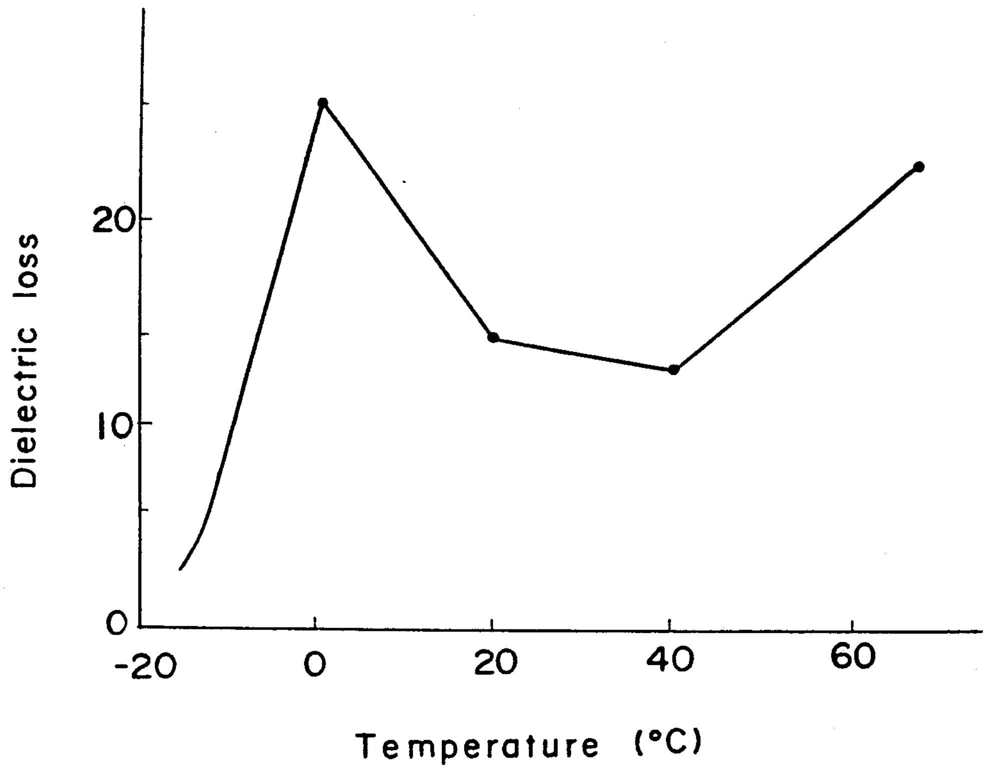
FIG. 4 is a graph showing the temperature characteristics of dielectric loss of a food in the heating apparatus of FIG. 1.

FIG. 4 shows temperature characteristics of dielectric loss ($\epsilon_r \times \tan\delta$) of beef or fish measured at a frequency of 2,400 MHz in the heating apparatus K. It is apparent from FIG. 4 that dielectric loss changes greatly between a frozen state, a defrosted state, a room temperature state and a heated state of the food. This phenomenon in which dielectric loss is great indicates that electromagnetic waves are well absorbed by the food.

Figure 5:
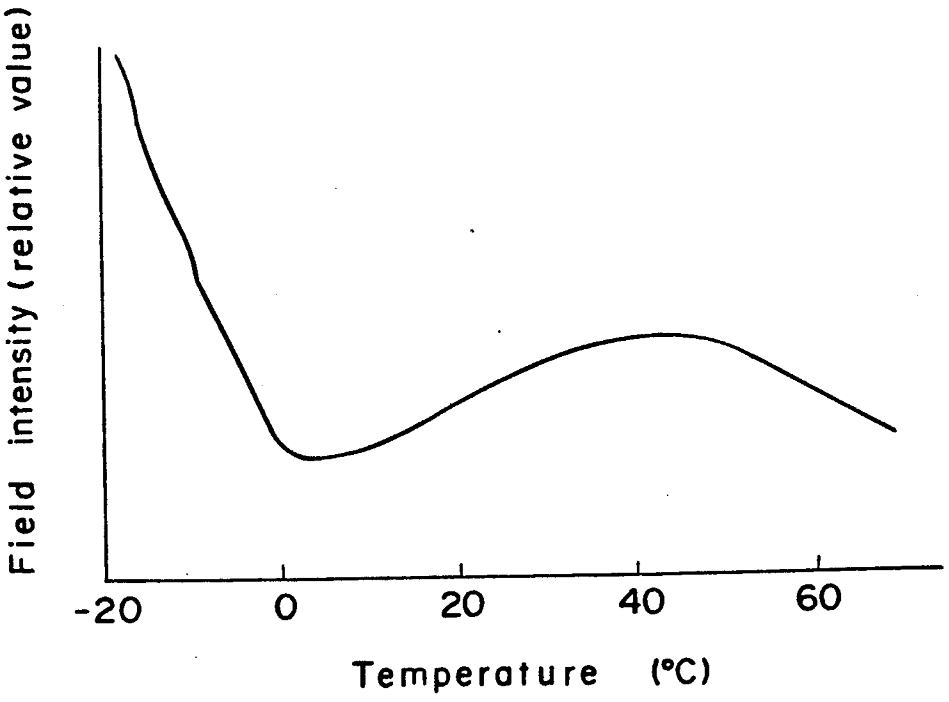
FIG. 5 is a graph showing a waveform of the detection output in the heating apparatus of FIG. 1.

FIG. 5 shows one example of detection output in the case of heating beef from a frozen state in the heating apparatus K. From FIGS. 4 and 5, it will be seen that when dielectric loss of the food is small, detection output is large. On the other hand, when dielectric loss of the food is large, detection output becomes small. Therefore, by controlling the power source circuit 11 on the basis of magnitude of detection output or trend of change of detection output, it becomes possible to automatically detect defrosting or heating of the food.

As is clear from the foregoing, in the heating apparatus of the present invention, the receiving antenna is provided outside the heating chamber and electromagnetic waves from the opening of the cabinet are received through the dielectric plate so as to be detected. Furthermore, the grounded faces of the detector are connected to the heating chamber. Therefore, in accordance with the present invention, even if water or oil scatters from the food, an undesirable phenomenon does not take place in which the antenna is short-circuited to the grounded faces by water or oil of the food, so that stable control performance of the heating apparatus can be secured for a long term. Moreover, even if mass production of the heating apparatus is performed, the detector can function stably.

Meanwhile, since the conductor piece of the printed circuit board which constitutes the detector formed by the microstrip line acts as the antenna, dimensional accuracy of the antenna is more excellent than an arrangement in which an antenna is provided outwardly of the printed circuit board or an arrangement in which a metallic rod acting as an antenna is vertically erected on the printed circuit board. Therefore, in accordance with the present invention, the antenna has stable microwave characteristics.

In addition, by using a frequency filter circuit based on the microstrip line constituted by the printed circuit board, electrical parts for the detector such as the resistors, the diode and the capacitor may function at a relatively low frequency, so that the detector can be produced at low cost and stably.

Meanwhile, since the longitudinal direction of the opening extends obliquely relative to the straight portion of the contour defined by the heating chamber in the plan at which the opening confronts the dielectric plate, the antenna is least likely to be affected by mode changes of the standing waves in the heating chamber. Therefore, in the detector of the present invention, the average entire change of the dielectric loss in the heating chamber can be received by the single antenna without the need for providing a plurality of the antennas.

Furthermore, since the longitudinal direction of the opening deviates from the longitudinal direction of the antenna, the average entire change of dielectric loss in the heating chamber can be received by the antenna.

Moreover, since the amplifier is provided between the detector and the control circuit, the power source circuit can be controlled at a high signal level against noise.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A high-frequency heating apparatus comprising:

a high-frequency oscillator for generating a high-frequency electromagnetic wave using electrical power supplied from a power source circuit;

a heating chamber into which the high-frequency electromagnetic wave is supplied by said high-frequency oscillator, said heating chamber being provided with a coupling opening;

a receiving antenna which is provided adjacent said coupling opening and entirely outside said heating chamber;

a dielectric plate which is provided between said receiving antenna and said heating chamber;

a detector for receiving an output from said receiving antenna; and a control circuit for receiving an output from said detector and for outputting a control signal to said power source circuit.

2. A high-frequency heating apparatus as claimed in claim 1, wherein said detector is formed by a printed circuit board having a conductor piece which acts as said receiving antenna.

3. A high-frequency heating apparatus as claimed in claim 1, wherein said coupling opening has an elongated shape and said heating chamber includes at least one plane which intersects a plane at which the opening confronts said dielectric plate, an intersection of the plane and said at least one plate forming at least one straight line, wherein a longitudinal direction of said coupling opening extends obliquely relative to said at least one straight line.

4. A high-frequency heating apparatus as claimed in claim 1, wherein said coupling opening has an elongated shape and a longitudinal direction of said coupling opening is shifted from a longitudinal direction of said receiving antenna.

5. A high-frequency heating apparatus as claimed in claim 1, further comprising:

an amplifier which is provided between said detector and said control circuit.

6. A high-frequency heating apparatus comprising:

a high-frequency oscillator for a generating high-frequency electromagnetic wave using electrical power supplied from a power source circuit;

a heating chamber into which the high-frequency electromagnetic wave is supplied by said high-frequency oscillator;

a receiving antenna which is provided entirely outside said heating chamber and adjacent to an opening of said heating chamber for receiving the high frequency electromagnetic wave;

a dielectric plate for covering the opening, which is provided in said heating chamber to confront said receiving antenna through the opening;

a detector for receiving an output from said receiving antenna and having a grounded portion connected to said heating chamber; and a control circuit for receiving an output from said detector and for outputting a control signal to said power source circuit in response thereto;

wherein the opening has an elongated shape and said heating chamber includes at least one plane which intersects a plane at which the opening confronts said dielectric plate, an intersection of the plane and said at least one plane forming at least one straight line, wherein a longitudinal direction of the opening extends obliquely relative to said at least one straight line.

7. A high-frequency heating apparatus comprising:

a high-frequency oscillator for generating a high-frequency electromagnetic wave using electrical power supplied from a power source circuit;

a heating chamber into which the high-frequency electromagnetic wave is supplied by said high-frequency oscillator;

a receiving antenna which is provided entirely outside said heating chamber and adjacent to an opening of said heating chamber for receiving the high frequency electromagnetic wave;

a dielectric plate for covering the opening, which is provided in said heating chamber to confront said receiving antenna through the opening;

a detector for receiving an output from said receiving antenna and having a grounded portion connected to said heating chamber; and a control circuit for receiving an output from said detector and for outputting a control signal to said power source circuit in response thereto;

wherein the opening has an elongated shape and a longitudinal direction of the opening is shifted from a longitudinal direction of said receiving antenna.

* * * * *